Patented Oct. 5, 1954

2,690,975

UNITED STATES PATENT OFFICE 2,690,975

HYDRAULIC CEMENT COMPOSITIONS

Edward W. Scripture, Jr., Cleveland, Ohio, assignor to The Master Builders Company, Cleveland, Ohio, a corporation of Ohio No Drawing. Application November 29, 1951, Serial No. 258,980

3 Claims. (Cl. 106—90)

This invention relates to hydraulic cement compositions, and particularly to Portland cement concrete or mortar mixes and additive compositions for modifying the properties thereof.

Among the desirable characteristics of hydraulic cement mixes for certain uses, in addition to high ultimate strength, are high early strengths and rapid initial set to permit early finishing of the surface, as by troweling, and early load sustaining properties. These characteristics are particularly desired when the cement mixes are to be used in constructing concrete floors and other paved areas.

The principal object of the present invention is to provide hydraulic cement concrete or mortar mixes that have a shortened finishing time, i. e., that rapidly harden sufficiently to be troweled to give the desired surface texture, that also have good early strength and resistance to the destructive effects of freezing, thawing, and de-icing with salts, and that still have high ultimate strength.

Another object of the invention is to provide compositions for addition to hydraulic cement mixes for accomplishing the foregoing objective.

Unmodified hydraulic cement concretes do not stand up well when subjected to freezing and thawing conditions in the colder climates and to attack by salts used for de-icing, and additives for increasing the resistance of concretes to such conditions have also been employed for a number of years. These additives are known as air entraining agents.

Other additives have been employed to increase the ultimate strength of hydraulic cement mixes, and the most widely used compositions for this purpose are known as cement dispersing agents. These agents tend to plasticize the cement mixes, thus reducing the amount of water required to produce mixes of a required plasticity, and the resulting reduction in the water-cement ratio increases the ultimate strength of the hardened concretes.

One of the problems that has arisen in the use of additives for various purposes is that their use to improve cement mixes in certain respects has generally produced concretes that are inferior in other respects. Attempts to use a multiplicity of additives to obtain the beneficial effect of each and counteract the deleterious effects of each other have often been unsuccessful.

What are believed to be the first cement dispersing agents known to the art were disclosed in U. S. Patent No. 2,141,569, granted to George R. Tucker, December 27, 1938. These compositions are organic compounds of the type resulting from the condensation of aromatic sulphonic acids with formaldehyde or higher alkyl aldehydes, and optionally neutralizing the reaction product with an alkali or alkaline earth hydroxide to produce a soluble salt form of the condensation product. The most conveniently produced compounds of this class, and the ones apparently preferred by Tucker for this reason, are compounds produced by condensing formaldehyde or its equivalent with naphthalene sulphonic acid or its homologues or derivatives, and optionally neutralizing the condensation product to convert the compounds to soluble salts. Tucker proposed that such condensation products be used in amounts of from 0.1% to 0.3% by weight of the hydraulic cement. For convenience in the following discussion, the class of compounds disclosed by Tucker will be referred to herein as "Tucker's condensation product."

Another class of cement dispersing agents consists of various waste sulfite liquor derivatives in which the active ingredient is a soluble salt of lignosulphonic acid. My U. S. Patent No. 2,169,980, granted August 15, 1939, discloses and claims hydraulic cement mixes containing the water soluble constituents of waste sulfite liquor. U. S. Patent No. 2,435,594 to Donald R. MacPherson, granted February 10, 1948, discloses and claims cement mixes containing the solids of waste sulfite liquor from which the fermentable sugars, glucosides, and the like present in the starting material have been extracted by fermentation and removal of the resulting alcohols by distillation. Separation of these fermentable materials to produce substantially equivalent waste sulfite liquor residues may also be accomplished by known chemical processes and by the action of certain yeast that feed on the fermentable materials and consume them without converting them to alcohols. For convenience, the solids of waste sulfite liquor remaining after the removal of fermentable materials by one process or another are referred to herein as "desugarized waste sulfite liquor solids," it being understood that the term "sugars" is used broadly in this connection to include the various fermentable materials having certain sugar-like properties.

Tucker's condensation product and the plain and desugarized waste sulfite liquor solids have somewhat similar cement dispersing properties, and also entrain substantial amounts of air.

Though known in the art for use in accomplishing the same general results, they do not accomplish those results to the same degree and are not equivalents in their effects upon the physical properties of cement mixes.

While Tucker's condensation product and its many variants do reduce the amount of water required to produce a cement mix having a given plasticity, they do not materially increase the ultimate strength of the hardened cement mix, as might be expected from the reduction in the water-cement ratio, and they have little or no effect on early strengths at from 1 to 3 days. Also, they are only fair air entraining agents. As a result, Tucker's condensation product and its variants have met with substantially no commercial use.

Unmodified waste sulfite liquor solids, when used in amounts of from 0.15% to 0.3% by weight of the hydraulic cement, materially increase the ultimate strength of cement mixes. By reason of the air entrainment resulting from their use, they also increase resistance to destruction from freezing and thawing and counteract the scaling effects of de-icing with various salts. Thus, this type of cement additive has gone into extensive commercial use. However, it has the drawback for certain uses, particularly for floors and outdoor paving, of greatly retarding the initial set and the rate of gain of strength with age. This retarding action is substantial at normal temperatures and is even more pronounced at low temperatures. Consequently, the use of this type of additive has been objectionable where rapid initial set and high early strength are desired. This is particularly so in the case of cement floors and paved areas because of the delay encountered before the cement mix has set sufficiently for surface finishing and before it is capable of carrying any appreciable loads.

The desugarized waste sulfite liquor solids of MacPherson are superior to unmodified waste sulfite liquor solids as regards the early strength of cement mixes containing them, and they produce an actual increase in strength as early as about 3 to 7 days. However, they still cause about a 50% reduction in strength at one day and substantially prolong the finishing time. (See Example 2 of the MacPherson patent.)

As regards the finishing time, Tucker's condensation product is not objectionable and actually appears to shorten the finishing time slightly in some instances. However, this effect is so slight, at best, that it is inconsequential, and the relatively inferior air entraining properties and cement dispersing properties of such compounds have rendered them commercially unsatisfactory for any purpose up to this time.

While the finishing time of cement mixes may be shortened by the use of substantial amounts of an accelerator, such as calcium chloride, the use of calcium chloride in sufficient amount to counteract the early retarding effects of the various waste sulfite liquors is believed to aggravate reaction between high alkali cements and reactive aggregates and to have other undesirable effects, such as excessive heat evolution and volume change during setting of the cement. Such soluble salts also tend to increase efflorescence of the hardened concrete.

In accordance with the present invention, I have discovered that the finishing time and early rate of gain of strength may be greatly improved by incorporating in the cement mixes a combination of a condensation product of the type disclosed by Tucker and desugarized waste sulfite liquor solids, each being used in an amount somewhat less than has been previously recommended when used separately for their air entraining and cement dispersing effects. The amounts of these materials previously considered to be the optimum for most purposes when used individually, do not shorten the finishing time or increase the rate of gain of strength when such amounts of each are combined in the same mix. Surprisingly, however, when these materials are employed together in somewhat lesser amounts, the initial set is substantially accelerated and the finishing time corespondingly reduced. This is unexplainable from anything heretofore known regarding the behavior of these materials. The amounts of these two materials which I prefer to employ in combination, produces, when used separately, little or no effect on the finishing time in the case of Tucker's condensation product and a substantially greater finishing time and slower initial set in the case of desugarized waste sulfite liquor solids. Why the combination of these materials in such amounts results in a substantial decrease in the finishing time is something which I am as yet unable to explain. However, the behavior of the materials, alone and in combination, may be illustrated by comparative tests as follows:

A series of concrete mixes was prepared with the same cement and aggregate, each having a nominal cement factor of 6 sacks per cu. yd. of concrete and a slump of 6 inches determined by the standard A. S. T. M. method. One mix contained no additives and served as a control. Two contained different amounts of desugarized waste sulfite liquor (designated "desug. W. S. L.") as the only additive, and two contained different amounts of the sodium salt of the product of condensation of formaldehyde with naphthalene sulfonic acid (designated "Tucker C-P") as the only additive. Slabs 14″ x 18″ x 4″ thick were cast from each mix and the time required before they could be finished by troweling was determined at 70° F. The results of these tests are set forth in Table I.

Table I

| Additive | Finishing Time, Hours at 70° F. |
| --- | --- |
| None | 10.0 |
| 0.16% desug. W. S. L | 11.3 |
| 0.27% desug. W. S. L | 12.0 |
| 0.11% Tucker C-P | 9.3 |
| 0.27% Tucker C-P | 9.3 |

From the foregoing data it will be noted that the desugarized waste sulfite liquor prolonged the finishing time from 13% to 20%, and that Tucker's condensation product reduced the finishing time about 7%.

In a similar set of tests the combination of 0.2% desugarized waste sulfite liquor and 0.25% of Tucker's condensation product merely entrained an excessive amount of air, giving a relatively weak concrete and no noticeable acceleration of the finishing time.

In still another set of similar tests, however, in which the desugarized waste sulfite liquor and Tucker's condensation product were combined in smaller amounts in the same mix and compared with one containing desugarized waste sulfite liquor plus calcium chloride and another control containing no additive, a surprising acceleration of the initial set together with unusual ultimate strength were obtained. These results are shown in Table II.

*Table II*

| Additive | Finishing Time, Hours at 70° F. | Compressive Strength, 28 days |
|---|---|---|
| None | 10.7 | 5,000 #/sq. in. |
| 0.27% desug. W. S. L. 0.27% CaCl₂ | 11.0 | 5,500 #/sq. in. |
| 0.18% desug. W. S. L. 0.09% Tucker's C-P | 9.8 | 5,920 #/sq. in. |

As shown in Table II, the use of desugarized waste sulfite liquor in combination with calcium chloride in the second test still prolonged the finishing time, though producing about the expected gain in ultimate strength. But when the desugarized waste sulfite liquor in smaller amount was combined with a still smaller amount of Tucker's condensation product in the third test, the finishing time at 70° F. was reduced about 8% while obtaining even higher ultimate strength than in the second test.

These last results are surprising in two respects, viz. the combination of one ingredient that prolongs and another that only slightly reduces the finishing time results in a far greater reduction in finishing time than the most effective of the two ingredients when used separately, and the combination of one ingredient that substantially increases ultimate strength with another that is relatively ineffective for that purpose results in a greater, rather than a lesser ultimate strength.

When employing the present invention, the condensation product used may be varied widely within the class represented by the formula:

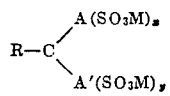

where R is hydrogen or a straight or branched chain aliphatic radical, A and A' are the same or different aromatic radicals, M is hydrogen, an alkali or alkaline earth metal, or other solubilizing, salt-forming radical such as amine radicals, $x$ is 0 or an integer from 1 to about 3, and $y$ is an integer from 1 to about 3. The class may be generically described as consisting of the water-soluble products of condensation of sulfonated aromatic hydrocarbons with aliphatic aldehydes and the water-soluble salts of such condensation products. Examples of such compounds, which I have found to be suitable for use in the present invention, include the acid form of the products of condensing an aliphatic aldehyde, such as formaldehyde, acetaldehyde, etc., with naphthalene sulfonic acid, or with methylnaphthalene sulfonic acid; the sodium, potassium, calcium, and ammonium salts of such condensation products; and the dimethylamine and diethylamine salts of such condensation products. As is apparent, the nature of the solubilizing radical is of no particular significance and plays no part in controlling the character of the results achieved. Also, the number of carbon atoms in the aliphatic aldehyde is immaterial except as limited by the requirement that the final condensation product be water-soluble.

While the invention involves the use of desugarized waste sulfite liquor solids, as defined above, it will also be understood that these solids may be retained in a liquid medium or placed in a liquid medium before or at the time of incorporating them into a cement mix.

I have also found that the incorporation in the composition of a small amount of an accelerator such as calcium chloride, sodium silicate, or potassium bichromate will further improve the properties of the mix, particularly with respect to finishing time and early strength. Thus, my preferred indurating composition comprises 0.11% of waste sulfite liquor, 0.08% of naphthalene sulphonic acid, formaldehyde condensate, and 0.09% of calcium chloride, all based on the weight of the cement.

The results obtained with such a composition are given in Table III, where they are compared with the results from the same basic mix containing no additives and from the same basic mix containing conventional amounts of desugarized waste sulfite liquor solids and calcium chloride as the only additives. To illustrate how lower curing temperatures magnify the differences in finishing time, finishing tests were made in this case at both 70° F. and 45° F.

*Table III*

| Additive | Finishing Time, Hours | | Compressive Strength, 28 days |
|---|---|---|---|
| | 70° F. | 45° F. | |
| None | 12.7 | 20.1 | 4,640 |
| 0.27% desug. W. S. L. 0.27% CaCl₂ | 13.0 | 20.3 | 5,710 |
| 0.11% desug. W. S. L. 0.08% Tucker's C-P 0.09% CaCl₂ | 11.3 | 16.0 | 6,190 |

When the two principal additives are used in combination in accordance with the present invention, from about 0.05% to 0.25% of desugarized waste sulfite liquor solids and from about 0.05% to 0.20% of the condensation product, by weight based on the cement, are suitable for most purposes, though there are no critical limits. Amounts either below or above these ranges have insufficient accelerating action, or none at all, and larger amounts also reduce the early strengths and, by entraining an excessive amount of air, reduce the ultimate strength to a degree that is generally unsatisfactory.

The relative amounts of the two types of additives are also important. I preferably employ from about 1 to 3 parts of the condensation product to 3 parts of desugarized waste sulfite liquor solids. Where the two additives are present in equal amounts, they should not exceed about 0.20% each, by weight based on the cement. With lower amounts of the condensation product, the amount of desugarized waste sulfite liquor may run as high as the maximum of 0.25% indicated above, with good results. When calcium chloride is also included, the amount of the condensation product relative to the amount of desugarized waste sulfite liquor should be kept well above the minimum ratio of 1:3, indicated above, and preferably above 1:2. The amount of calcium chloride may be roughly the same as the amount of the condensation product. In such cases, the preferred amounts of the three additives are all in the range of about 0.05% to 0.15% based on the weight of the cement.

A mixture of the two additives in the proper proportions is the most convenient for addition to cement mixes, though the individual ingredients may be separately added. In either case, the additives may be mixed with a hydraulic cement before grinding and be ground therewith, or may be mixed therewith at any time up to the final mixing of a hydraulic cement concrete or mortar.

It may occur with some cements and aggregates and under some conditions that the compositions of the invention which are in other respects most desirable do not incorporate the optimum percentage of air in the mix for maximum durability. In such cases, small percentages of known air entraining agents, such as sodium lauryl sulphate, or tall oil, or air entraining agents such as described in my copending application Serial No. 60,635, filed November 17, 1948, for Cement Composition and Indurating Composition Therefor, Patent No. 2,593,492, may be incorporated in the composition, or in the concrete mix to increase the entrained air content to the percentage desired.

Similarly, where maximum ultimate strength is desired and freezing conditions are not likely to be encountered, the entrainment of air may be undesirable and a suitable "air detraining agent" may be incorporated in a cement mix with the additives of the present invention. A large number of air detraining agents, which are liquid organic compounds characterized by water-insolubility and the presence of both a lyophilic group and a hydrocarbon lyophobic group are disclosed in my copending application Serial No. 90,549, filed April 29, 1949, for Cement Compositions, now abandoned.

The additives employed in accordance with this invention, including calcium chloride or other accelerator, as well as still other additives, may all be mixed together in the form of dried powders, or they may be utilized dissolved in water. It is not necessary that the desugarized waste sulfite liquor be secured in the first instance in the dried form, but it is usually more convenient for handling and storage to have all the ingredients dry. It is, however, customary to dissolve or suspend additive compositions in water at the location where the concrete is made, and to measure them and add them to the concrete in the form of a solution or suspension. The present invention may be carried out in this manner.

The additive composition may also be incorporated in dry form in the cement itself by intergrinding or by mixing the cement and composition prior to use.

Having described my invention, I claim:

1. A cement composition comprising an hydraulic cement, from about 0.05% to 0.25% by weight of the cement of desugarized waste sulfite liquor solids, and from about 0.05% to 0.20% by weight of the cement of a member of the class consisting of the water-soluble products of condensation of sulfonated aromatic hydrocarbons with aliphatic aldehydes and the water-soluble salts of said products.

2. A cement composition comprising an hydraulic cement, from about 0.05% to 0.25% by weight of the cement of desugarized waste sulfite liquor solids, and from about 0.05% to 0.20% by weight of the cement of a member of the class consisting of the water-soluble products of condensation of sulfonated aromatic hydrocarbons with aliphatic aldehydes and the water-soluble salts of said products, there being from about 1 to 3 parts of a member of said class to 3 parts of desugarized waste sulfite liquor.

3. A cement composition comprising an hydraulic cement, from about 0.05% to 0.15% each, by weight of the cement of desugarized waste sulfite liquor solids, as one additive, a member of the class consisting of the water-soluble products of condensation of sulfonated aromatic hydrocarbons with aliphatic aldehydes and water-soluble salts of said products, as a second additive, and calcium chloride as a third additive, said second and third additives being present in the proportions of about 1 to 2 parts of each to 2 parts of said first additive.

References Cited in the file of this patent

UNITED STATES PATENTS

| Number | Name | Date |
|---|---|---|
| 2,141,569 | Tucker | Dec. 27, 1938 |
| 2,141,571 | Kennedy | Dec. 27, 1938 |
| 2,383,891 | Scripture | Aug. 28, 1945 |
| 2,435,594 | MacPherson | Feb. 10, 1948 |
| 2,485,102 | MacPherson | Oct. 18, 1949 |